(12) United States Patent
Eto et al.

(10) Patent No.: US 8,651,135 B2
(45) Date of Patent: Feb. 18, 2014

(54) MASS FLOW CONTROLLER, MASS FLOW CONTROLLER SYSTEM, SUBSTRATE PROCESSING DEVICE, AND GAS FLOW RATE ADJUSTING METHOD

(75) Inventors: Hideo Eto, Mie (JP); Makoto Saito, Mie (JP); Nobuyasu Nishiyama, Mie (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 13/173,409

(22) Filed: Jun. 30, 2011

(65) Prior Publication Data
US 2012/0000542 A1 Jan. 5, 2012

(30) Foreign Application Priority Data

Jun. 30, 2010 (JP) ................................. 2010-149570
May 31, 2011 (JP) ................................. 2011-122390

(51) Int. Cl.
*F16K 31/02* (2006.01)
(52) U.S. Cl.
USPC .................. 137/487.5; 137/486; 137/599.07; 137/599.08; 156/345.26; 156/345.15
(58) Field of Classification Search
USPC .................... 137/487.5, 486, 599.06, 599.07, 137/599.08; 156/345.026, 345.24, 345.15, 156/345.26
See application file for complete search history.

(56) References Cited

U.S. PATENT DOCUMENTS

| | | | | |
|---|---|---|---|---|
| 5,062,446 A | * | 11/1991 | Anderson | 137/468 |
| 5,439,026 A | * | 8/1995 | Moriya et al. | 137/486 |
| 5,911,238 A | * | 6/1999 | Bump et al. | 137/487.5 |
| 6,655,408 B2 | * | 12/2003 | Linthorst | 137/487.5 |
| 7,140,384 B2 | * | 11/2006 | Kang et al. | 137/487.5 |
| 7,437,944 B2 | * | 10/2008 | Melcer et al. | 73/861 |
| 7,510,884 B2 | * | 3/2009 | Okabe et al. | 438/11 |
| 7,699,932 B2 | * | 4/2010 | Miller et al. | 118/715 |
| 7,748,268 B2 | | 7/2010 | Lull et al. | |
| 7,826,986 B2 | * | 11/2010 | McDonald | 702/45 |
| 8,196,601 B2 | * | 6/2012 | Smirnov | 137/468 |
| 8,205,629 B2 | * | 6/2012 | Gregor et al. | 137/2 |
| 8,356,623 B2 | * | 1/2013 | Isobe et al. | 137/486 |

(Continued)

FOREIGN PATENT DOCUMENTS

| | | |
|---|---|---|
| JP | 7-142406 | 6/1995 |
| JP | 10-214117 | 8/1998 |

(Continued)

OTHER PUBLICATIONS

U.S. Appl. No. 13/419,675, filed Mar. 14, 2010, Eto, et al.

*Primary Examiner* — John Rivell
*Assistant Examiner* — Minh Le
(74) *Attorney, Agent, or Firm* — Oblon, Spivak, McClelland, Maier & Neustadt, L.L.P.

(57) ABSTRACT

According to one embodiment, a flow rate adjusting unit is disposed on a gas passageway and includes a valve that adjusts the flow rate of a gas and an actuator that controls the displacement amount of the valve. A displacement amount storage unit stores displacement amount information in which a displacement amount of the valve, used when a gas flows into the gas passageway at a flow rate defined according to a process procedure before performing the process procedure, is obtained in advance for each process procedure. A setting circuit acquires the displacement amount corresponding to the process procedure from the displacement amount storage unit, and controls the actuator on the basis of the acquired displacement amount.

7 Claims, 10 Drawing Sheets

(56) References Cited

U.S. PATENT DOCUMENTS

| | | | |
|---|---|---|---|
| 2002/0189681 A1* | 12/2002 | Linthorst | 137/487.5 |
| 2006/0054219 A1* | 3/2006 | Sund et al. | 137/487.5 |
| 2006/0124173 A1* | 6/2006 | An | 137/487.5 |
| 2008/0045031 A1* | 2/2008 | Hirotsu et al. | 438/729 |
| 2010/0200083 A1* | 8/2010 | Kouchi et al. | 137/486 |
| 2011/0003258 A1* | 1/2011 | Carlson | 431/2 |
| 2011/0054702 A1* | 3/2011 | Smirnov et al. | 700/282 |
| 2011/0132873 A1* | 6/2011 | Tsujimoto et al. | 216/59 |
| 2011/0191038 A1* | 8/2011 | Lull | 702/47 |
| 2012/0197446 A1* | 8/2012 | Glaudel | 700/282 |

FOREIGN PATENT DOCUMENTS

| | | |
|---|---|---|
| JP | 2003-65462 | 3/2003 |
| JP | 2003-158122 | 5/2003 |
| JP | 3424758 | 5/2003 |
| JP | 2004-157719 | 6/2004 |
| JP | 2004-214591 | 7/2004 |
| JP | 3637270 | 1/2005 |
| JP | 2005-301692 | 10/2005 |
| JP | 2007-184329 | 7/2007 |
| JP | 2008-91625 | 4/2008 |

* cited by examiner

<NORMAL STATE OF FIRST STEP>

<NORMAL STATE OF SECOND STEP>

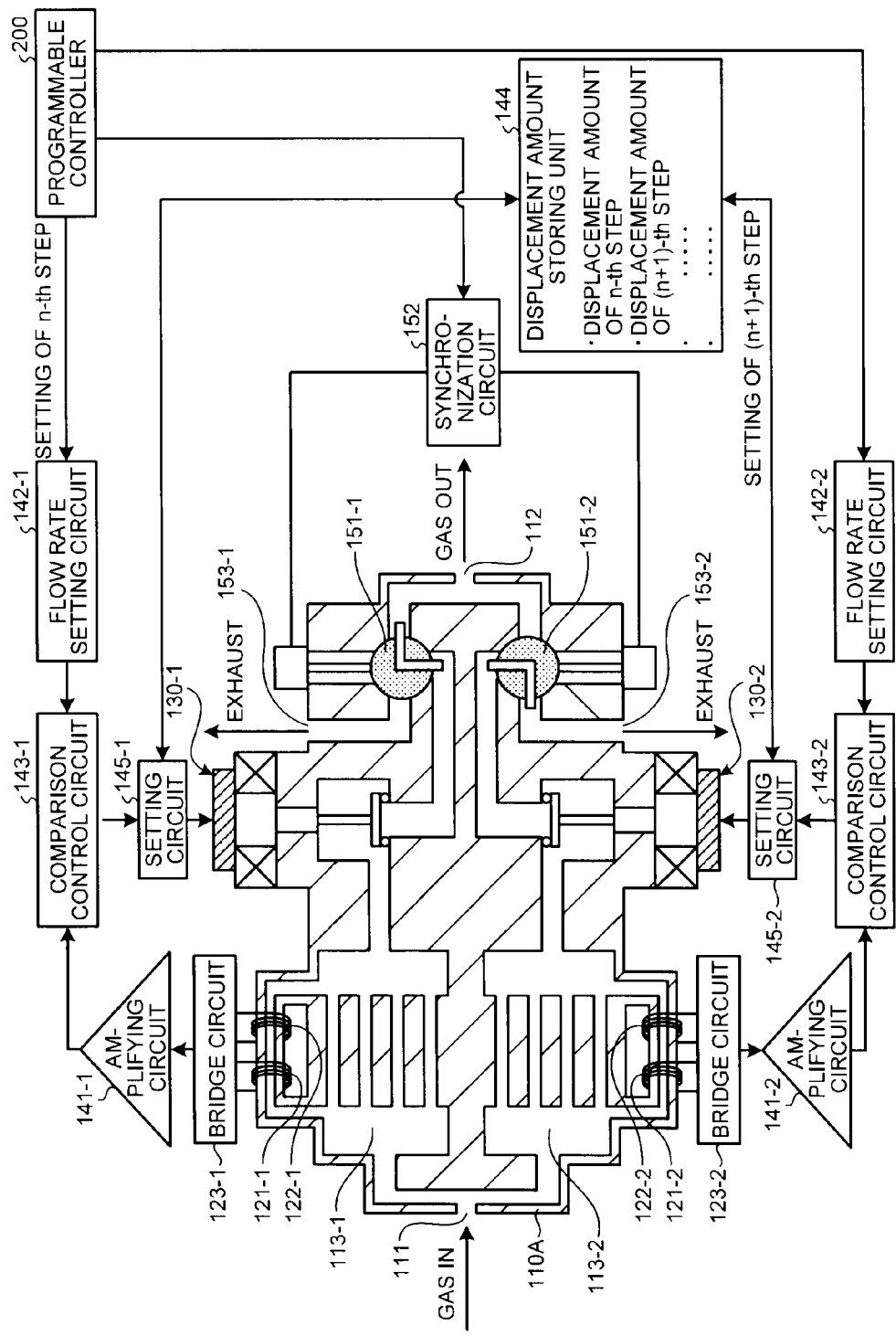

MASS FLOW CONTROLLER, MASS FLOW CONTROLLER SYSTEM, SUBSTRATE PROCESSING DEVICE, AND GAS FLOW RATE ADJUSTING METHOD

CROSS-REFERENCE TO RELATED APPLICATIONS

This application is based upon and claims the benefit of priority from the prior Japanese Patent Application No. 2010-149570, filed on Jun. 30, 2010, and the prior Japanese Patent Application No. 2011-122390, filed on May 31, 2011; the entire contents of all of which are incorporated herein by reference.

FIELD

Embodiments described herein relate generally to a mass flow controller, a mass flow controller system, a substrate processing device, and a gas flow rate adjusting method.

BACKGROUND

Hitherto, a manufacturing method of semiconductor devices or the like includes a plurality of steps of processes, during each of which gas systems introduced into a chamber are varied in order to enable continuous processing such as multi-layered film processing using a reactive ion etching (RIE) process. In general, a mass flow controller is used to adjust a flow rate of a gas introduced into the chamber.

However, the existing mass flow controller generally performs feed-back control of comparing a flow rate detected by a flow rate detector with a flow rate setting value and adjusting an opening degree of a valve in accordance with the difference therebetween. For this reason, for example, when the flow rate of the gas needs to be changed, there is a problem in that it takes a time for the opening of the valve to reach a desired degree which results in a desired flow rate, after a flow rate setting value is changed.

BRIEF DESCRIPTION OF THE DRAWINGS

FIG. 7 is a diagram schematically illustrating a configuration of a mass flow controller according to a second embodiment;

DETAILED DESCRIPTION

According to one embodiment, a mass flow controller includes a gas passageway forming member forming a gas passageway, a flow rate adjusting unit, an opening degree setting information storage unit, and a setting unit. The flow rate adjusting unit is disposed in the gas passageway, and includes a valve adjusting the flow rate of a gas and an actuator controlling the opening degree of the valve. The opening degree setting information storage unit stores opening degree setting information in which an opening degree setting value of the valve, used when a gas flows into the gas passageway with a flow rate defined according to the process procedure before performing the process procedure, is obtained in advance for each process procedure. The setting unit acquires the opening degree setting value corresponding to the process procedure from the opening degree setting information storage unit, and controls the actuator on the basis of the acquired opening degree setting value.

Exemplary embodiments of the mass flow controller, the mass flow controller system, the substrate processing device, and the gas flow rate adjusting method will be described below in detail with reference to the accompanying drawings. The present invention is not limited to the following embodiments.

First Embodiment

Figure 1:
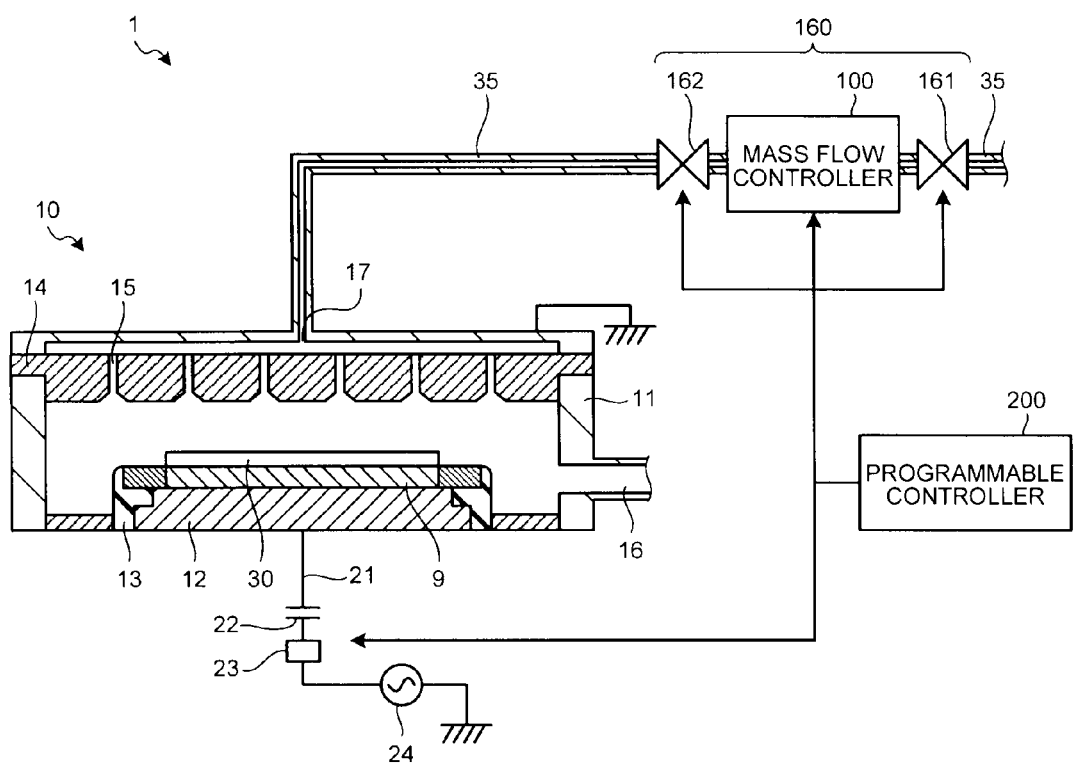
FIG. 1 is a diagram schematically illustrating an example of a configuration of a substrate processing device adopting a mass flow controller according to a first embodiment.

FIG. 1 is a diagram schematically illustrating an example of a configuration of a substrate processing device adopting a mass flow controller according to a first embodiment. Here, an RIE device 1 is exemplified as the substrate processing device. The RIE device 1 includes a plasma processing chamber 10 that is a substrate processing chamber for processing a processing subject such as a wafer, a mass flow controller system 160 that supplies a predetermined amount of gas to the plasma processing chamber 10, and a programmable controller 200 that controls the entire RIE device 1 in accordance with a program.

The plasma processing chamber 10 is configured as, for example, an air-tight aluminic chamber 11. The chamber 11 is grounded. The chamber 11 has therein an electrostatic chuck 9 electrostatically suctioning and holding a wafer 30 as a processing subject and a lower electrode 12. The electrostatic chuck 9 and the lower electrode 12 constitute a support table. An insulating ring 13 is provided to cover the peripheral edges of the side surface and the bottom surface of the electrostatic chuck 9 and the lower electrode 12, and electrically insulate between the chamber 11, and the electrostatic chuck 9 and the lower electrode 12.

The lower electrode 12 is connected with a power feeding line 21 supplying radio frequency power, and the power feeding line 21 is connected with a blocking capacitor 22, a matching box 23, and a radio frequency power supply 24. The radio frequency power with a predetermined frequency is supplied from the radio frequency power supply 24 to the lower electrode 12.

The chamber 11 has therein a shower head 14 provided above the lower electrode 12 to face the lower electrode 12 and serve as an upper electrode. The shower head 14 is fixed to a side wall around the upper portion of the chamber 11 away from the lower electrode 12 by a predetermined distance so that the shower head 14 is parallel to the lower electrode 12. With such a structure, the shower head 14 and the lower electrode 12 form a pair of parallel flat electrodes. Further, the shower head 14 is provided with a plurality of penetration holes 15 penetrating the shower head 14 in the thickness direction of a plate constituting the shower head 14, and the gas supplied from the penetration holes 15 to the upper portion of the shower head 14 is supplied into the chamber 11.

A gas exhaust port 16 is provided at the lower portion of the chamber 11, and the gas exhaust port 16 is connected with a vacuum pump (not shown) through a pipe. Further, a gas supply port 17 is provided near the upper portion of the chamber 11 so that a process gas used for a plasma process is supplied therethrough, and the gas supply port 17 is connected with a gas supply device (not shown) through a gas pipe 35. The mass flow controller system 160 is provided between the gas supply port 17 and the gas supply device to adjust the flow rate of the gas flowing through the gas pipe 35.

The mass flow controller system 160 includes a mass flow controller 100, a gas valve 161 provided at the upstream of the gas stream of the mass flow controller 100, and a gas valve 162 provided at the downstream thereof.

Although it will be described in detail later, the mass flow controller 100 supplies a predetermined flow rate of gas into the chamber 11 in accordance with the instruction from the programmable controller 200. The programmable controller 200 adjusts the flow rate of the gas using the mass flow controller 100 or controls the matching box 23 or the radio frequency power supply 24 enabling or disabling a plasma generation operation on the basis of a program created by a user and storing a process procedure. Further, the gas valves 161 and 162 are also opened or closed in accordance with the instruction from the programmable controller 200, so that the on/off state of the gas flowing through the gas pipe 35 is switched. The gas valves 161 and 162 are opened when a gas is supplied into the chamber 11, and are closed when a gas is not supplied into the chamber 11.

The outline of the RIE device 1 with such a configuration will be described. First, the wafer 30 as the processing subject is placed and fixed onto the electrostatic chuck 9. Then, the inside of the chamber 11 becomes a vacuum state by the vacuum pump (not shown) connected to the gas exhaust port 16. Subsequently, when the pressure inside the chamber 11 reaches a predetermined pressure, the gas valves 161 and 162 are opened, a gas supplied from the gas supply device (not shown) is adjusted by the mass flow controller 100 to have a predetermined flow rate, and the gas is supplied into the chamber 11 through the penetration holes 15 of the shower head 14. When the pressure inside the chamber 11 reaches a predetermined pressure, a radio frequency voltage is applied to the lower electrode 12 while the shower head 14 (the upper electrode) is grounded, and plasma is generated inside the plasma processing chamber 10 through the impedance matching using the matching box 23. Here, since the radio frequency voltage is applied to the lower electrode, voltage gradient is generated between the plasma and the wafer 30, so that ions in the plasma accelerated to the wafer 30 and anisotropic etching is performed.

Figure 2:
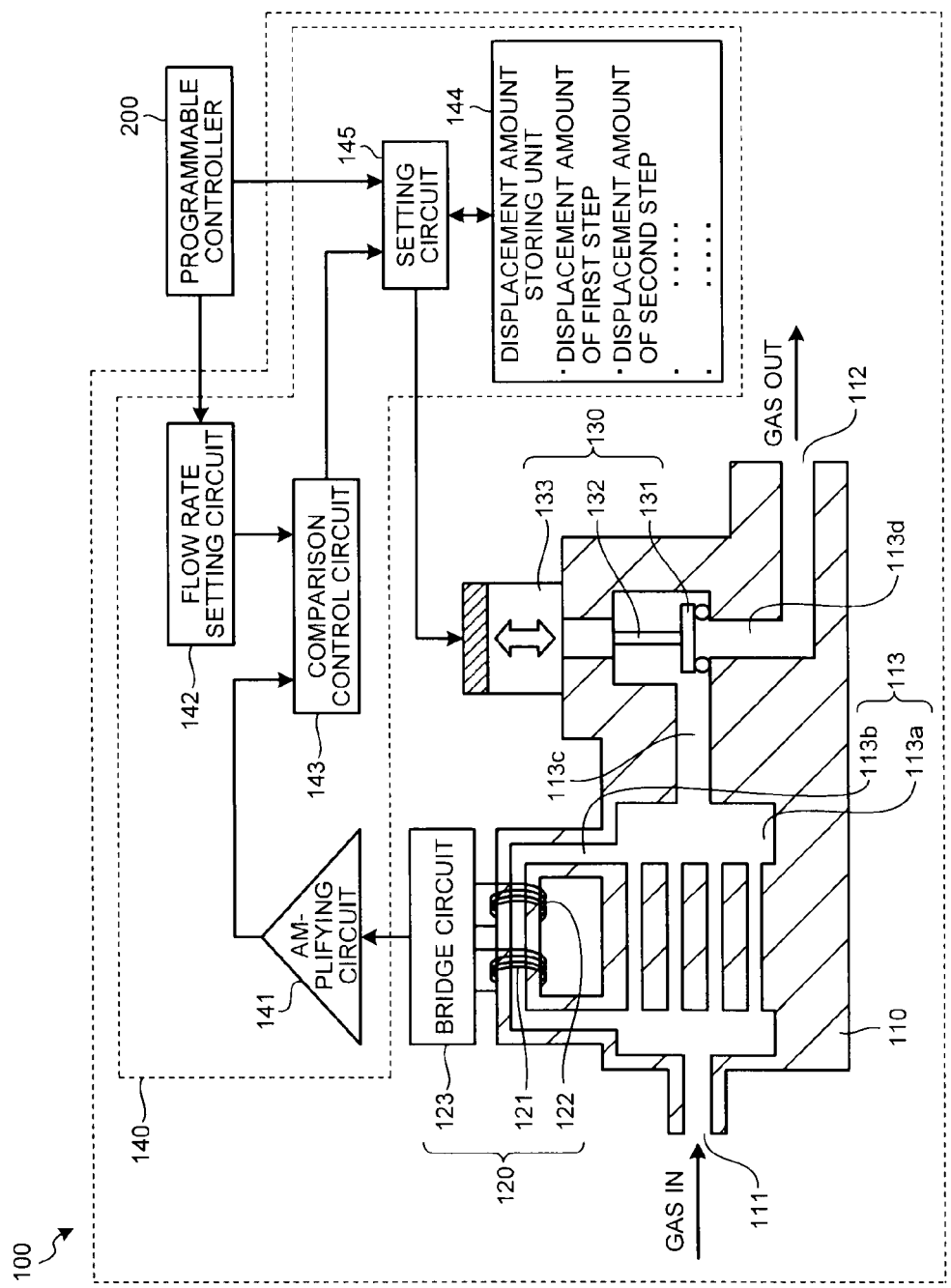
FIG. 2 is a diagram schematically illustrating the configuration of the mass flow controller according to the first embodiment.

FIG. 2 is a diagram schematically illustrating the configuration of the mass flow controller according to the first embodiment. The mass flow controller 100 includes a gas passageway forming member 110, a flow rate detecting unit 120, a flow rate adjusting unit 130, and a flow rate control and processing unit 140.

The gas passageway forming member 110 includes a gas inlet port 111 that is connected to the gas pipe 35 near the gas supply device (not shown) of FIG. 1, a gas outlet port 112 that is connected to the gas pipe 35 near the plasma processing chamber 10, and a gas passageway 113 that is provided between the gas inlet port 111 and the gas outlet port 112. In the gas passageway 113, a flow rate detecting unit 120 is provided at a bypassing path 113b branched from a main stream portion 113a, and the flow rate adjusting unit 130 is provided at the downstream of a joined gas passageway 113c.

In the flow rate adjusting unit 130, the flow rate is adjusted by opening or closing a valve 131 provided between the gas passageways 113c and 113d. The opening and closing operation of the valve 131 is controlled (adjusted) in accordance with a moving amount of an actuator 133 connected through a rod 132.

The flow rate detecting unit 120 is configured as, for example, a thermal mass flow meter, and includes two thermoresistors 121 and 122 provided in the bypassing path 113b and a bridge circuit 123 detecting a variation in resistance between the two thermoresistors 121 and 122. The thermoresistors 121 and 122 are configured as a resistor with a large temperature coefficient of resistance, and are respectively wrapped around the upstream and downstream of the bypassing path 113b.

Specifically, in the case of sensing, current flows to the two thermoresistors 121 and 122 having the same characteristics and provided at the upstream and the downstream of the bypassing path 113b, and the bypassing path 113b is heated so that the temperatures of the two positions are equal to each other. In this state, when a gas with a room temperature or so flows to the bypassing path 113b, a difference in temperature is generated between the temperature of the upstream thermoresistor 121 and the temperature of the downstream thermoresistor 122, so that the resistance becomes unbalanced. Then, the variation in resistance is detected by the bridge circuit 123, and is output as a flow rate measurement value.

The flow rate controlling and processing unit 140 includes an amplifying circuit 141, a flow rate setting circuit 142, a comparison control circuit 143, a displacement amount storage unit 144, and a setting circuit 145. The amplifying circuit 141 amplifies the flow rate measurement value electrically output by the bridge circuit 123. The flow rate setting circuit 142 sets a predetermined gas flow rate with respect to the comparison control circuit 143.

The comparison control circuit 143 compares the flow rate measurement value from the amplifying circuit 141 with the flow rate setting value set in the flow rate setting circuit 142. Then, when there is a difference between the two, the comparison control circuit calculates a setting signal changing the opening degree of the flow rate adjusting unit 130 (the position of the valve 131) in the direction in which the difference is removed (or the difference is included in a predetermined range), and outputs the setting signal to the setting circuit 145. That is, the setting signal corresponds to the displacement amount of the valve 131 changed by the actuator 133. Further, the comparison control circuit 143 stores opening degree adjustment information which is used to determine how much the opening degree of the flow rate adjusting unit 130 needs to be changed to remove the difference between the flow rate measurement value and the flow rate setting value, and outputs the displacement amount on the basis of the opening degree adjustment information.

The displacement amount storage unit 144 stores displacement information that defines the opening degree of the flow rate adjusting unit 130 to obtain a desired gas flow rate when the gas flow rate as the processing condition is changed. Specifically, the opening degree corresponds to the displacement amount of the valve 131 for each process step (process procedure). As the displacement amount stored on the displacement amount storage unit 144, the displacement amount of the valve 131 from the precedent process step may be used, or the displacement amount from the reference position of the valve 131 may be used.

The setting circuit 145 controls the actuator 133 on the basis of the displacement amount stored on the displacement amount storage unit 144 and corresponding to the process step when receiving a signal representing the movement to the subsequent process step (process procedure) from the programmable controller 200 or receiving the setting signal from the comparison control circuit 143. Specifically, when the displacement amount is stored on the displacement amount storage unit 144, if the setting circuit receives a signal representing the switching of the step (process procedure) from the programmable controller 200, the setting circuit 145 sets the displacement amount of the actuator 133 on the basis of the displacement amount information stored on the displacement amount storage unit 144. Further, when the displacement amount is not stored on the displacement amount storage unit 144, the setting unit sets the displacement amount of the actuator 133 on the basis of the setting signal from the comparison control circuit 143. At this time, the setting circuit 145 stores the set displacement amount on the displacement amount storage unit 144. Furthermore, when the displacement amount is not stored on the displacement amount storage unit 144, the flow rate controlling and processing unit 140 performs a feed-back control until the flow rate measurement value from the flow rate detecting unit 120 becomes equal to the flow rate setting value.

Further, the displacement amount stored on the displacement amount storage unit 144 may be corrected at a predetermined time interval by using the flow rate measurement value and the flow rate setting value in order to check whether the gas flow rate is equal to the flow rate setting value or to correct a difference when the gas flow rate is different from the flow rate setting value when it becomes a normal state after the step is switched and the gas flow rate is changed. In this case, the setting circuit 145 corrects the displacement amount stored on the displacement amount storage unit 144 by setting the setting signal output from the comparison control circuit 143 as the correction amount. At this time, it is desirable to perform the correction process until the correction amount becomes zero, or the correction amount is included in a predetermined range in the end.

Figure 3:
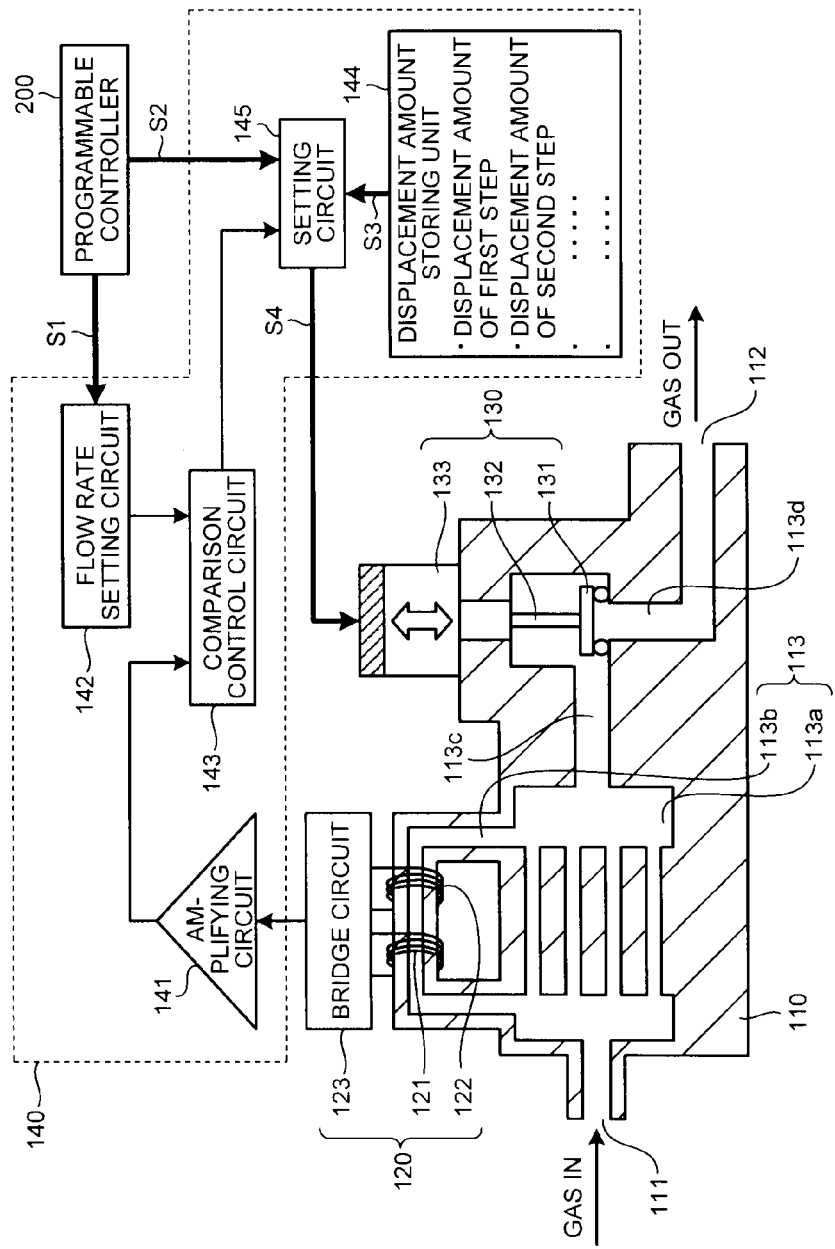
FIG. 3 is a diagram illustrating an example of a procedure of a gas flow rate adjusting method when switching to a first step according to the first embodiment.

Next, the gas flow rate adjusting method will be described. FIGS. 3 to 6 are diagrams illustrating an example of the gas flow rate adjusting method according to the first embodiment. FIG. 3 illustrates a shape when switching to the first step. First, the programmable controller 200 performs a program of the first step (the displacement amount of the valve 131 is denoted by a). However, at this time, the programmable controller 200 sets the flow rate of the first step in the flow rate setting circuit 142 (signal S1). Further, the programmable controller 200 informs the setting circuit 145 that the current step is shifted to the first step (signal S2).

When the setting circuit 145 detects that the current step is shifted to the first step, the setting circuit acquires the displacement amount corresponding to the first step from the displacement amount storage unit 144 (signal S3), and sets the displacement amount in the actuator 133 (signal S4). In accordance with the displacement of the actuator 133, the valve 131 is displaced by the set displacement amount a.

In this manner, the feed-forward control is performed in which the valve 131 is displaced so that the displacement amount becomes equal to the displacement amount of the valve 131 obtained in advance to correspond to the flow rate of the gas to flow. Accordingly, it is possible to promptly reach the desired gas flow rate compared to the case where the feed-back control of the actuator 133 is performed by comparing the flow rate measurement value detected in the flow rate detecting unit 120 and the predetermined flow rate setting value.

Figure 4:
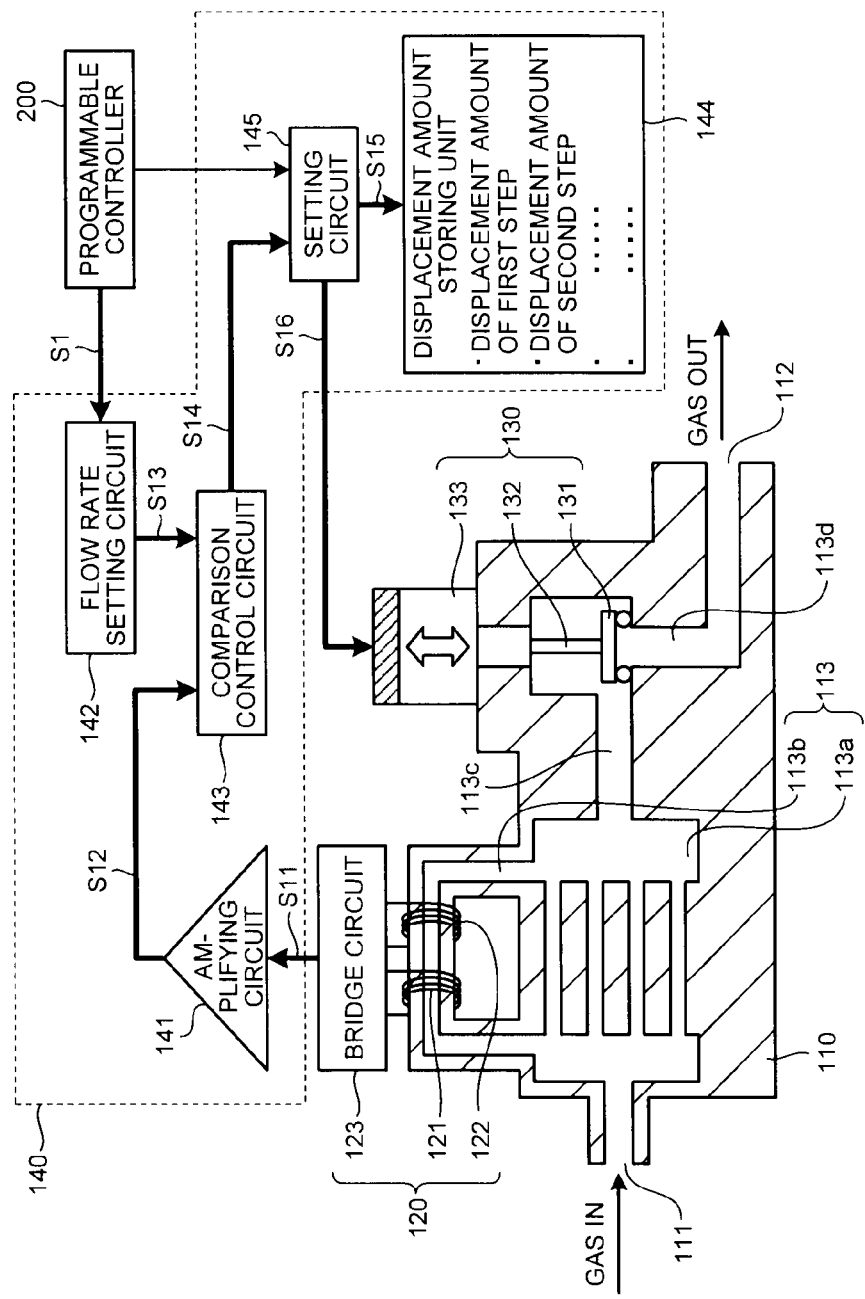
FIG. 4 is a diagram illustrating an example of the procedure of the gas flow rate adjusting method in the normal state of the first step according to the first embodiment.

FIG. 4 illustrates a shape in the normal state of the first step. Specifically, it is a state where the gas flow rate becomes stable after a predetermined time is elapsed from the time when the gas flow rate is switched in FIG. 3. Even in this state, as in the case of FIG. 3, it is possible to adjust the gas flow rate on the basis of the displacement amount corresponding to the first step stored on the displacement amount storage unit 144. However, here, a case will be described in which the feed-back control is performed in the normal state. For example, the following control process using the setting circuit 145 is performed after a predetermined time equal to or longer than the time necessary until the gas flow rate becomes a normal state is elapsed from the time when receiving an instruction from the programmable controller 200 by the signals S1 and S2.

The flow rate of the gas flowing through the bypassing path 113b is detected as a resistance variation value by the bridge circuit 123, and the resistance variation value is output as a flow rate measurement value to the amplifying circuit 141 (signal S11). The flow rate measurement value is amplified in the amplifying circuit 141, and is output to the comparison control circuit 143 (signal S12).

On the other hand, the flow rate setting value of the first step set in the flow rate setting circuit 142 in signal S1 is output from the programmable controller 200 to the comparison control circuit 143 (signal S13). In the comparison control circuit 143, a difference between the flow rate measurement value and the flow rate setting value is obtained, the correction amount as the displacement amount of the valve 131 removing the difference is calculated on the basis of the opening degree control information, and the correction amount is output to the setting circuit 145 (signal S14).

The setting circuit 145 corrects the displacement amount stored on the displacement amount storage unit 144 by the input correction amount, and writes a new displacement amount therein (signal S15). Further, the setting circuit 145 controls the actuator on the basis of the correction amount (signal S16). At this time, when the correction amount is not zero (or the correction amount is not included in a predetermined range), the above-described process is repeated until the correction amount becomes zero (until the correction amount is included in a predetermined range). When the correction amount is zero (or the correction amount is included in a predetermined range), the feed-back control process ends.

Figure 5:
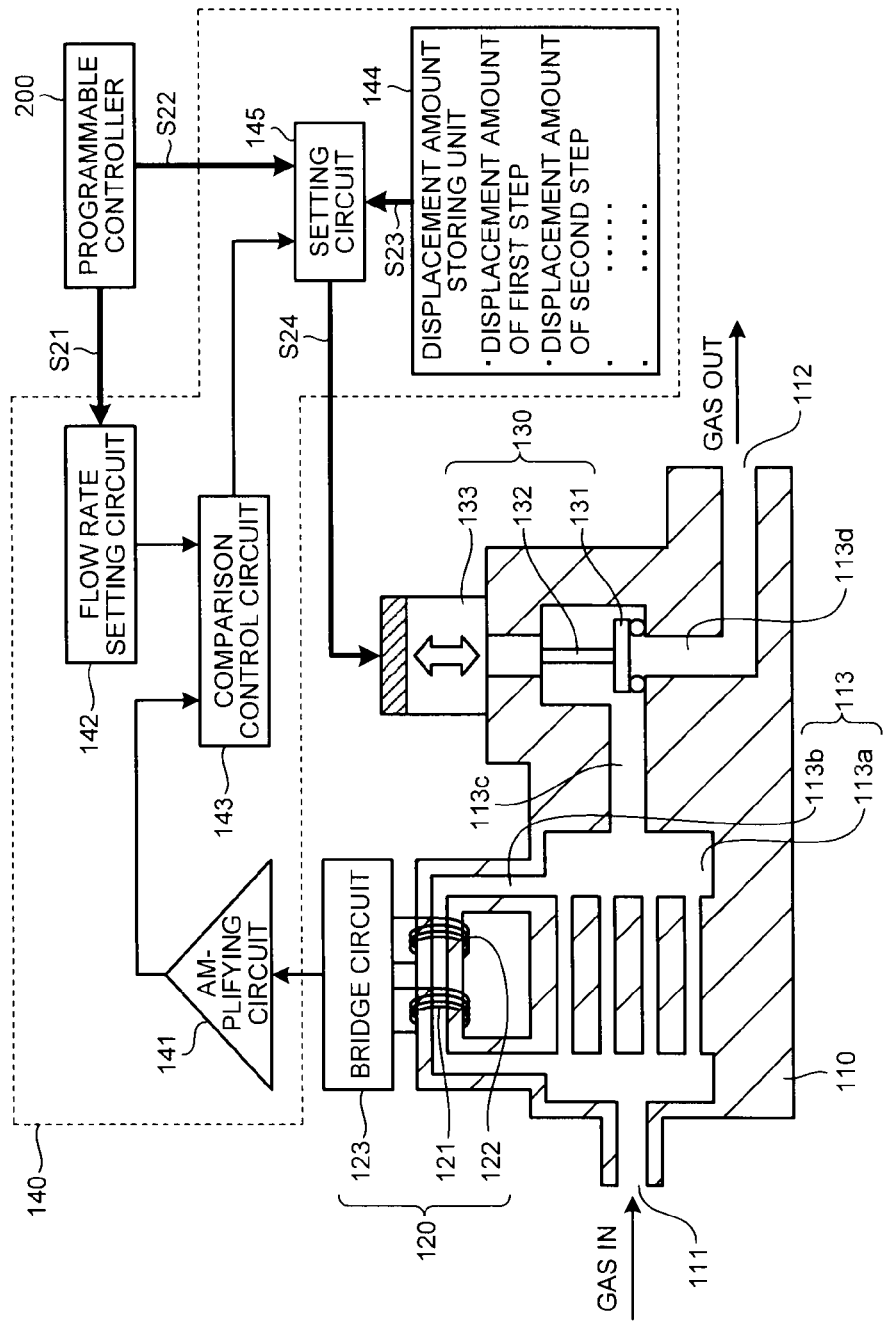
FIG. 5 is a diagram illustrating an example of the procedure of the gas flow rate adjusting method when switching to a second step according to the first embodiment.

Subsequently, a second step is performed by the programmable controller 200 after a predetermined time is elapsed. FIG. 5 illustrates a shape when switching to the second step. First, the programmable controller 200 performs a program of the second step (the displacement amount of the valve 131 is denoted by b). However, at this time, the programmable controller 200 sets the flow rate setting value of the second step in the flow rate setting circuit 142 (signal S21). Further, the programmable controller 200 informs the setting circuit 145 that the current step is shifted to the second step (signal S22).

When the setting circuit 145 detects that the current step is shifted to the second step, the setting circuit acquires the displacement amount corresponding to the second step from the displacement amount storage unit 144 (signal S23), and sets the displacement amount in the actuator 133 (signal S24). In accordance with the displacement of the actuator 133, the valve 131 is displaced by the set displacement amount b.

Figure 6:
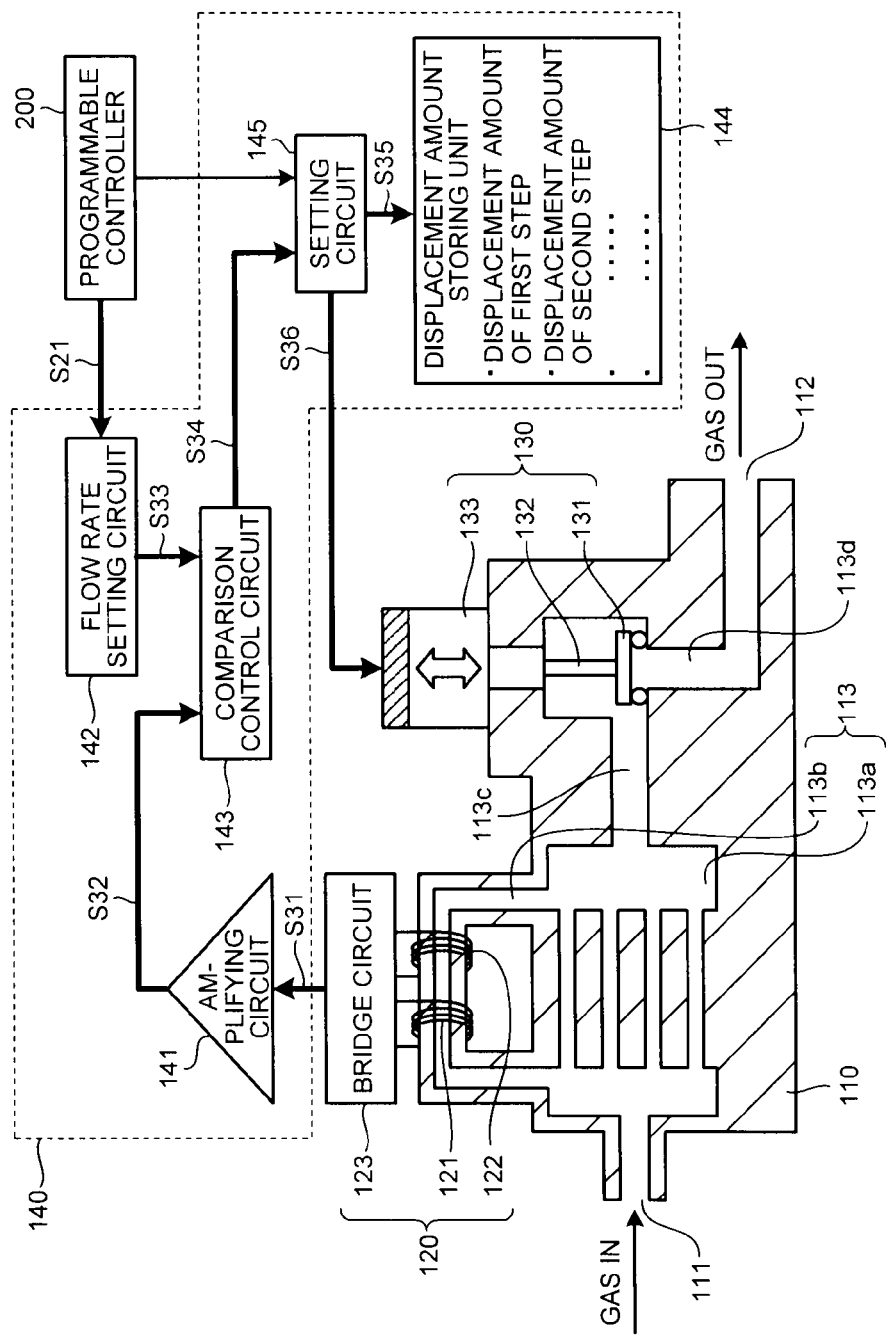
FIG. 6 is a diagram illustrating an example of the procedure of the gas flow rate adjusting method in the normal state of the third step according to the first embodiment.

FIG. 6 illustrates a shape in the normal state of the second step. Specifically, it is a state where the gas flow rate becomes stable after a predetermined time is elapsed from the time when the gas flow rate is switched in FIG. 5. Even in this state, as in the case of FIG. 5, it is possible to adjust the gas flow rate on the basis of the displacement amount corresponding to the second step stored on the displacement amount storage unit 144. However, here, a case will be described in which the feed-back control is performed in the normal state. For example, the following control process using the setting circuit 145 is performed after a predetermined time equal to or longer than the time necessary until the gas flow rate becomes a normal state is elapsed from the time when receiving an instruction from the programmable controller 200 by the signals S21 and S22.

The flow rate of the gas flowing through the bypassing path 113b is detected as a resistance variation value by the bridge circuit 123, and the resistance variation value is output as a flow rate measurement value to the amplifying circuit 141 (signal S31). The flow rate measurement value is amplified in the amplifying circuit 141, and is output to the comparison control circuit 143 (signal S32).

On the other hand, the flow rate setting value of the second step set in the flow rate setting circuit 142 in signal S21 is output from the programmable controller 200 to the comparison control circuit 143 (signal S33). In the comparison control circuit 143, a difference between the flow rate measurement value and the flow rate setting value is obtained, the correction amount as the displacement amount of the valve 131 removing the difference is calculated on the basis of the opening degree control information, and the correction amount is output to the setting circuit 145 (signal S34).

The setting circuit 145 corrects the displacement amount stored on the displacement amount storage unit 144 by the input correction amount, and writes a new displacement amount therein (signal S35). Further, the setting circuit 145 controls the actuator on the basis of the correction amount (signal S36). At this time, when the correction amount is not zero (or the correction amount is not included in a predetermined range), the above-described process is repeated until the correction amount becomes zero (until the correction amount is included in a predetermined range). When the correction amount is zero (or the correction amount is included in a predetermined range), the feed-back control process ends.

As described above, the steps described in FIGS. 3 to 6 are performed in accordance with the program set in the programmable controller 200.

Further, in the description above, a case has been described in which the displacement amount corresponding to the flow rate of each step is obtained in advance by an experiment and the displacement amount is stored on the displacement amount storage unit 144. However, a case may be adopted in which the displacement amount corresponding to the flow rate of each step is obtained when performing a process at first time and the displacement amount is written in the displacement amount storage unit 144. In this case, at the start time point of the first step of the first lot, data of the displacement amount is not written in the displacement amount storage unit 144, and as shown in FIG. 4, the displacement amount of the first step is determined by the feed-back control in the flow rate controlling and processing unit 140 so that the flow rate measurement value becomes equal to the flow rate setting value set by the programmable controller 200, and the displacement amount is stored as the value of the first step on the displacement amount storage unit 144. Further, after the second step, the displacement amount is stored on the displacement amount storage unit 144 in the same manner as above. As a result, the displacement amount for each step is stored on the displacement amount storage unit 144 at the time point when all steps for the first lot end. Then, after a second lot, the feed-forward control may be performed on the basis of the displacement amount for each step stored on the displacement amount storage unit 144 as described above by referring to FIGS. 3 and 5.

In the first embodiment, the opening degree of the flow rate adjusting unit 130 is obtained in advance with respect to the flow rate of the gas to flow, and the flow rate adjusting unit 130 is controlled by the actuator 133 so as to have an opening degree corresponding to the switched gas flow rate when the gas flow rate is switched. Accordingly, it is possible to promptly reach a desired flow rate value compared to the case where the desired gas flow rate is set by controlling the actuator 133 on the basis of the comparison result between the flow rate measurement value detected by the flow rate detecting unit 120 and the predetermined flow rate setting value.

Further, when the gas flow rate is switched and becomes a normal state, the feed-back control is performed so that the flow rate measurement value detected in the bridge circuit 123 becomes equal to the predetermined flow rate setting value, and the opening degree information of the flow rate adjusting unit 130 is corrected for the next use. Accordingly, it is possible to optimally update the opening degree information of the flow rate adjusting unit 130 to correspond to a temporal change of the device, and improve the control reliability of the gas flow rate.

Furthermore, the opening degree information of the flow rate adjusting unit 130 for each step of the first lot is obtained by the feed-back control, and the feed-forward control using the opening degree information from the second lot is performed for each step. Accordingly, it is not necessary to perform an experiment for obtaining the opening degree information of the flow rate adjusting unit 130 for a desired gas flow rate.

Second Embodiment

FIG. 7 is a diagram schematically illustrating a configuration of a mass flow controller according to a second embodiment. In the second embodiment, a dual system gas passageway 113 is provided between the gas inlet port 111 and the gas outlet port 112 in a gas passageway forming member 110A of the mass flow controller 100. That is, a first system gas passageway 113-1 is provided at the upper portion of the dual system gas passageway 113, and a second system gas passageway 113-2 is provided at the lower portion thereof. Further, the system gas passageways 113-1 and 113-2 are respectively provided with gas exhaust ports 153-1 and 153-2, and three-way valves 151-1 and 151-2 are provided at the positions where the gas exhaust ports 153-1 and 153-2 are provided in the gas passageways 113-1 and 113-2 so as to rapidly switch the stream of the gas between the gas passageways 113-1 and 113-2 and the gas exhaust ports 153-1 and 153-2. Furthermore, the three-way valves 151-1 and 151-2 are connected with a synchronization circuit 152. The three-way valves 151-1 and 151-2 are controlled by the synchronization circuit 152 so as to switch to a state where the first system gas passageway 113-1 is opened and the second system gas passageway 113-2 is closed or a state where the first system gas passageway 113-1 is closed and the second system gas passageway 113-2 is opened. Here, the state where the first system gas passageway 113-1 is opened and the second system gas passageway 113-2 is closed indicates a state where the three-way valves 151-1 and 151-2 are disposed so that the gas passageway 113-1 communicates with the gas outlet port 112 and the gas passageway 113-2 communicates with the gas exhaust port 153-2. Further, the state where the first system gas passageway 113-1 is closed and the second system gas passageway 113-2 is opened indicates a state where the three-way valves 151-1 and 151-2 are disposed so that the gas passageway 113-1 communicates with the gas exhaust port 153-2 and the gas passageway 113-2 communicates with the gas outlet port 112.

Further, each system is provided with flow rate adjusting units 130-1 and 130-2, thermoresistors 121-1, 122-1, 121-2, and 122-2, bridge circuits 123-1 and 123-2, amplifying circuits 141-1 and 141-2, flow rate setting circuits 142-1 and 142-2, comparison control circuits 143-1 and 143-2, and setting circuits 145-1 and 145-2, and one displacement amount storage unit 144 is provided for one mass flow controller 100. Furthermore, the displacement amount storage unit 144 may be provided for each system. Further, the same reference numerals will be given to the same components of the first embodiment, and the description thereof will not be repeated.

Figure 8A:
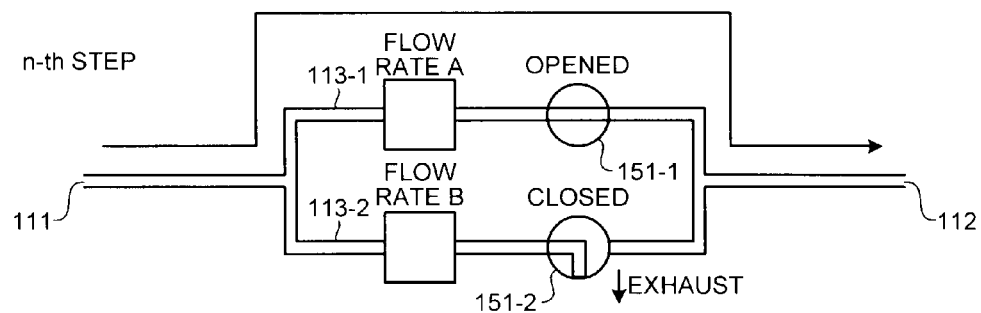
FIGS. 8A and 8B are diagrams schematically illustrating a gas flow rate adjusting method according to the second embodiment.
Figure 8B:
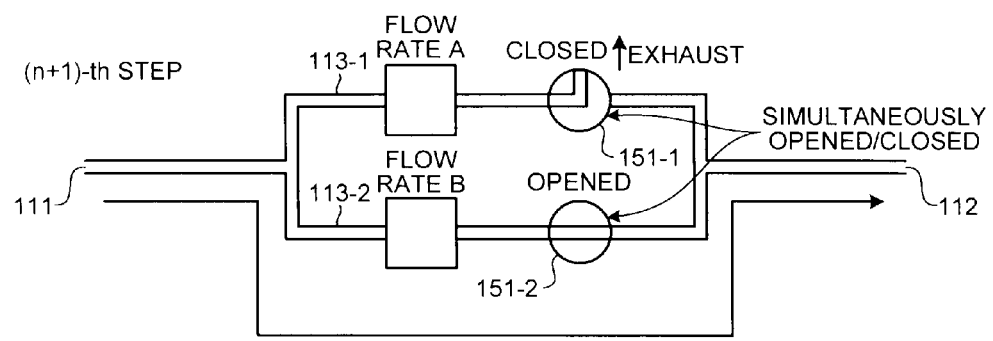

FIGS. 8A and 8B are diagrams schematically illustrating a gas flow rate adjusting method according to the second embodiment. FIG. 8A illustrates a state in the n-th step, and FIG. 8B illustrates a state in the (n+1)-th step. Here, the n-th step indicates a process of supplying a gas with a flow rate A, and the (n+1)-th step indicates a process of supplying a gas with a flow rate B.

In the n-th step, as shown in FIG. 8A, the setting circuit sets so that the gas flow rate of the first gas passageway 113-1 becomes the flow rate A. Further, the synchronization circuit allows the three-way valve 151-1 of the first gas passageway 113-1 to be opened and the three-way valve 151-2 of the second gas passageway 113-2 to be closed. In the middle of the n-th step, the programmable controller informs the setting circuit of the second gas passageway 113-2 that the next step is the (n+1)-th step. Then, the setting circuit of the second gas passageway 113-2 acquires the displacement amount corresponding to the (n+1)-th step from the displacement amount storage unit, and controls the actuator on the basis of the displacement amount so that the flow rate of the gas flowing through the second gas passageway 113-2 is adjusted to become the gas flow rate B. At this time, in the second gas passageway 113-2, since the three-way valve 151-2 is closed, the gas flowing through the second gas passageway 113-2 is discharged from the exhaust port. That is, the gas flowing into the gas inlet port 111 flows through the first gas passageway 113-1 and flows to the outside with the flow rate A from the gas outlet port 112. However, even in the second gas passageway 113-2, the gas is discharged from the exhaust port with the flow rate B.

Subsequently, as shown in FIG. 8B, when the process is switched to the (n+1)-th step, the synchronization circuit switches the three-way valves 151-1 and 151-2 in accordance with the instruction from the programmable controller. Specifically, the opening and closing operations are simultaneously performed so that the three-way valve 151-1 of the first gas passageway 113-1 is closed and the three-way valve 151-2 of the second gas passageway 113-2 is opened. Accordingly, the gas flowing into the gas inlet port 111 flows through the second gas passageway 113-2 and flows to the outside with the flow rate B from the gas outlet port 112, and in the first gas passageway 113-1, the gas is discharged from the exhaust port with the flow rate A.

Here, a case has been described in which a gas passageway 113 with two systems is provided, but a gas passageway with three or more systems may be provided. Further, a case has been described in which the flow rate adjusting unit for each passageway is controlled by a feed-forward control as in the first embodiment, but a feed-back control may be used.

In the second embodiment, the gas passageway forming member 110 is provided with the plurality of independent gas passageways 113-1 and 113-2. Then, in the n-th step, the flow rate adjusting unit 130-2 of the second gas passageway 113-2 is adjusted to have a gas flow rate necessary for the next (n+1)-th step during the time when the gas flow rate of the first gas passageway 113-1 is adjusted to become a predetermined gas flow rate. Then, at the time point when the n-th step is switched to the (n+1)-th step, the opening and closing states of the three-way valves 151-1 and 151-2 of the first and second gas passageways 113-1 and 113-2 are simultaneously switched. Specifically, the three-way valve 151-1 of the first gas passageway 113-1 is closed, and the three-way valve 151-2 of the second gas passageway 113-2 is opened. Accordingly, there is an advantage in that the gas flow rate may be rapidly switched at the same time when switching the step compared to the first embodiment.

Third Embodiment

In the first and second embodiments, the mass flow controller has been described. However, in the third embodiment, the mass flow controller system including the mass flow controller and the gas valves provided at the upstream and the downstream thereof will be described.

Figure 9:
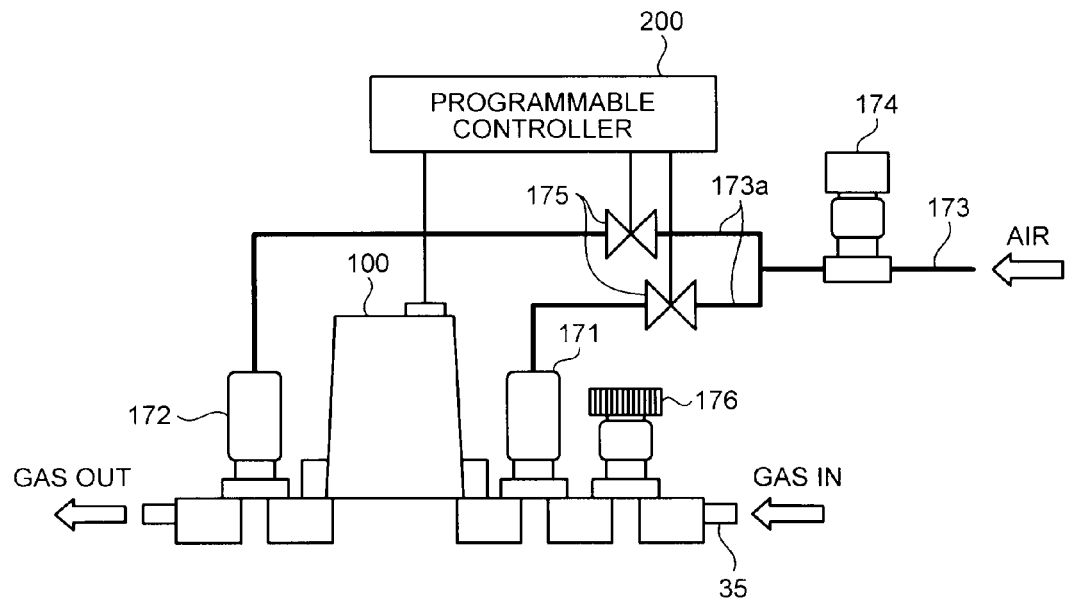
FIG. 9 is a diagram schematically illustrating a general configuration of a mass flow controller system.

FIG. 9 is a diagram schematically illustrating a general configuration of a mass flow controller system. In this example, a case is shown in which air operation valves are provided at the upstream and the downstream of the mass flow controller 100. An air operation valve 171 is provided at the gas pipe 35 at the upstream of the mass flow controller 100, and an air operation valve 172 is provided at the gas pipe 35 of the downstream thereof. Further, a hand valve 176 is provided at the more downstream of the air operation valve 171. In a general configuration, an air pipe 173 connected to an air supply device (not shown) is provided, and air pipes 173a branched from the air pipe 173 are respectively connected to the air operation valves 171 and 172. An air regulator 174 is provided on the air pipe 173 to constantly maintain the pressure of air supplied to the air operation valves 171 and 172, and an electromagnetic valve 175 is provided in each air pipe 173a to be opened or closed in accordance with the instruction from the programmable controller 200.

When the flow rate of the gas flowing through the gas pipe 35 is controlled, air is supplied from the air supply device (not shown), and the air regulator 174 makes the air pressure of each air pipe 173a have a predetermined value. Then, the electromagnetic valve 175 is controlled by the programmable controller 200, so that the air operation valves 171 and 172 are opened or closed. At this time, the programmable controller 200 instructs the mass flow controller 100 to perform the flow rate control, and the mass flow controller 100 controls the gas flowing through the gas pipe 35 in accordance with the instruction.

Since the air operation valves 171 and 172 are provided at the upstream and the downstream of the mass flow controller 100 through the gas pipe 35, there is a problem in that the dead space of the passageway increases. Therefore, in the third embodiment, the mass flow controller system 160 capable of solving such a problem will be described.

Figure 10:
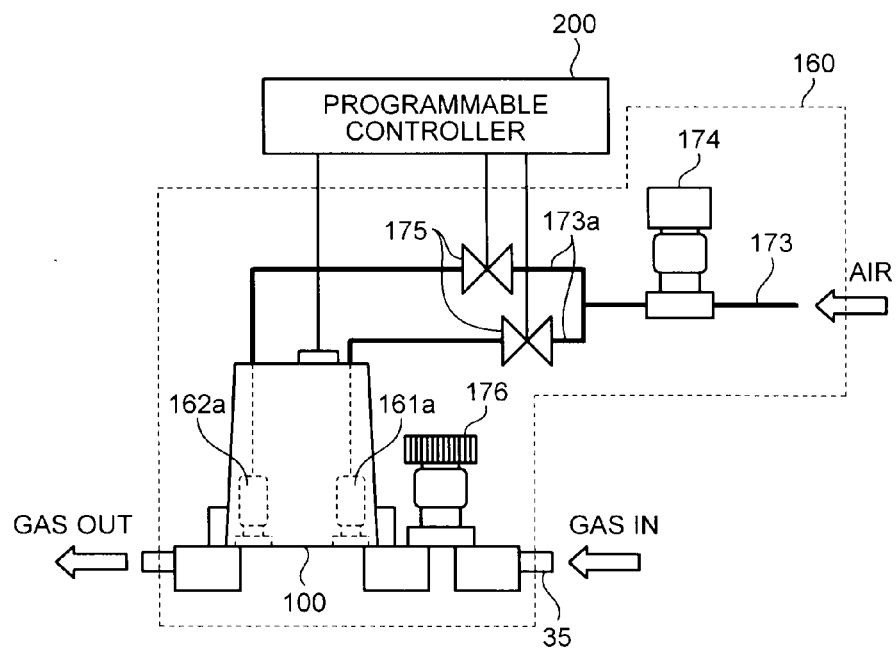
FIG. 10 is a diagram schematically illustrating a mass flow controller system according to a third embodiment.

FIG. 10 is a diagram schematically illustrating a mass flow controller system according to a third embodiment. The mass flow controller system 160 has a configuration in which the air operation valves 161a and 162a are disposed inside the mass flow controller 100. The air operation valve 161a is provided near, for example, the gas inlet port 111 inside the mass flow controller 100, and the air operation valve 162a is provided near, for example, the gas outlet port 112 inside the mass flow controller 100. Furthermore, the same reference numerals will be given to the same components shown in FIG. 9, and the description thereof will not be repeated.

In this manner, since the air operation valves 161a and 162a are provided inside the mass flow controller 100, it is possible to reduce the dead space by shortening the distance between each of the air operation valves 161a and 162a and the flow rate adjusting unit 130 inside the mass flow controller 100. Further, it is possible to promptly control the flow rate in the mass flow controller 100 after the opening operation of the air operation valves 161a and 162a compared to the general existing structure.

According to the third embodiment, since the air operation valves 161a and 162a are integrated inside the mass flow controller 100, there is an advantage in that the dead space of the mass flow controller system 160 may be reduced.

Fourth Embodiment

As shown in FIG. 9, in a general mass flow controller system using the air operation valves 171 and 172, when the programmable controller 200 generates an instruction of opening and closing the air operation valves 171 and 172 (an instruction to the electromagnetic valve 175 connected to the air operation valves 171 and 172), the electromagnetic valve 175 is operated. Subsequently, the stream of the air flowing through the air pipes 173 and 173a reaches the air operation valves 171 and 172, so that the air operation valves 171 and 172 are operated. As a result, the operation of the air operation valves 171 and 172 is delayed as much as the time taken until air is transferred to the air pipe 173a between the electromagnetic valve 175 and the air operation valves 171 and 172 after the instruction is generated from the programmable controller 200, and the operation thereof becomes unstable. Therefore, in the fourth embodiment, the mass flow controller system 160 capable of solving such a problem will be described.

Figure 11:
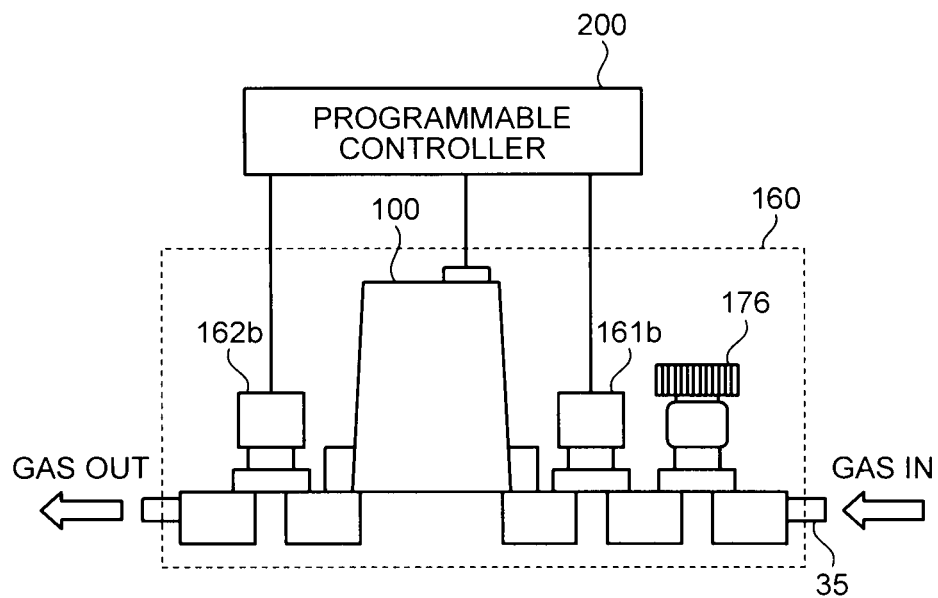
FIG. 11 is a diagram schematically illustrating a mass flow controller system according to a fourth embodiment.

FIG. 11 is a diagram schematically illustrating a mass flow controller system according to a fourth embodiment. In the mass flow controller system 160, the valves provided at the upstream and the downstream of the mass flow controller 100 are configured as electromagnetic valves 161b and 162b. Furthermore, the same reference numerals will be given to the same components shown in FIG. 9, and the description thereof will not be repeated.

In this manner, since the electromagnetic valves 161b and 162b are disposed at the upstream and the downstream of the mass flow controller 100, the instruction of opening or closing the valve from the programmable controller 200 is transmitted as signals to the electromagnetic valves 161b and 162b. As a result, the signals may be promptly transmitted to the electromagnetic valves 161b and 162b compared to the time taken until air is transferred to the air operation valves 171 and 172 after the instruction is generated from the programmable controller 200.

According to the fourth embodiment, since the electromagnetic valves 161b and 162b are used as the gas valves provided at the upstream and the downstream of the mass flow controller 100, there are advantages in that an on/off state of the gas flowing through the gas pipe 35 may be rapidly switched and the operation thereof may be stabilized compared to the case of using the air operation valve.

Fifth Embodiment

In the fifth embodiment, a mass flow controller system will be described which may reduce a dead space of a passageway and stably increase an operation speed of a gas valve.

Figure 12:
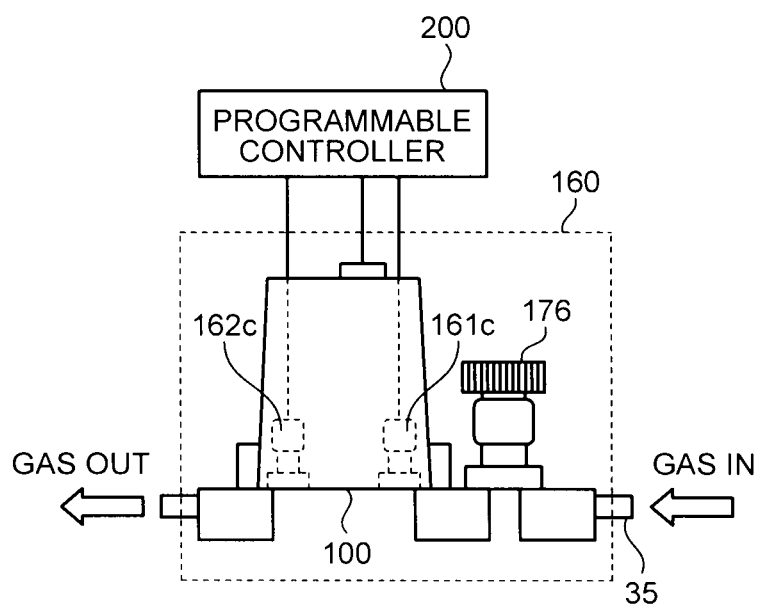
FIG. 12 is a diagram schematically illustrating a mass flow controller system according to a fifth embodiment.

FIG. 12 is a diagram schematically illustrating a mass flow controller system according to a fifth embodiment. The mass flow controller system 160 has a configuration in which electromagnetic valves 161c and 162c are disposed inside the mass flow controller 100. The electromagnetic valve 161c is provided near, for example, the gas inlet port 111 inside the mass flow controller 100, and the electromagnetic valve 162c is provided near, for example, the gas outlet port 112 inside the mass flow controller 100. Furthermore, the same reference numerals will be given to the same components shown in FIG. 9, and the description thereof will not be repeated.

In this manner, since the electromagnetic valves 161c and 162c are provided inside the mass flow controller 100, it is possible to reduce the dead space by shortening the distance between each of the electromagnetic valves 161c and 162c and the flow rate adjusting unit 130 inside the mass flow controller 100 and promptly perform the opening and closing operation of the valve from the programmable controller 200 compared to the general existing structure.

According to the fifth embodiment, since the electromagnetic valves 161c and 162c are integrated inside the mass flow controller 100, there are advantages in that the dead space inside the mass flow controller system 160 may be reduced and an on/off state of the gas flowing through the gas pipe 35 may be rapidly switched and the operation thereof may be stabilized compared to the case of using the air operation valve.

Furthermore, the mass flow controller 100 shown in the first and second embodiments may be used as the mass flow controller 100 used in the third to fifth embodiments.

Furthermore, in the description above, a case has been described in which the flow rate of one type of gas is newly switched as the process sequence stored on the program, but the above-described embodiments may be adopted even when a plurality of types of gases is switched. For example, in the example shown in the drawings, a case is shown in which one type of gas is supplied to the chamber 11. However, when a plurality of types of gases is supplied, a plurality of gas supply lines including the mass flow controller 100 may be provided in the gas pipe 35 connected to the chamber 11. Then, a gas is switched from a different gas supply line in accordance with the process sequence storing the gas switching instruction. Further, as the case of switching a plurality of types of gases, the process of mixing a plurality of types of gases may be stored as a process sequence as in the case where a first gas is supplied from a first gas supply line in accordance with a first flow rate, a second gas is supplied from a second gas supply line in accordance with a second flow rate, and the gases are mixed and supplied into the chamber 11. Furthermore, in the first and second embodiments, it is desirable that the conductance of the gas passageway from the mass flow controller 100 to the plasma processing chamber 10 be as small as possible. For example, it is desirable to adopt a configuration in which the distance between the mass flow controller 100 and the chamber 11 is 1 m or less and the gas pipe 35 to be connected has a diameter of ⅜ or more. Further, in the description above, the RIE device 1 has been exemplified as the substrate processing device, but the invention is not limited thereto, and a plasma chemical vapor deposition (CVD) device or the like may be adopted. Furthermore, the invention may be applied to not only the plasma processing device such as the RIE device 1 or the plasma CVD device, but also a device processing a substrate by supplying a gas into the chamber 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mass flow controller comprising:
    a gas passageway forming member that forms a gas passageway;
    a flow rate adjusting unit that is disposed in the gas passageway and includes a valve adjusting a flow rate of a gas and an actuator adjusting an opening degree of the valve;
    an opening degree setting information storage unit that stores opening degree setting information in which an opening degree setting value of the valve, used when a gas flows into the gas passageway with a flow rate defined according to a process procedure before performing the process procedure, is obtained in advance for each process procedure; and
    a setting unit that acquires the opening degree setting value corresponding to the process procedure from the opening degree setting information storage unit and controls the actuator on the basis of the acquired opening degree setting value,
    wherein the gas passageway forming member further includes:
    a gas inlet port,
    a gas outlet port,
    a plurality of independent gas passageways that connects the gas inlet port and the gas outlet port to each other,
    a gas exhaust port that is provided in each gas passageway,
    a three-way valve that is provided at the position where each gas exhaust port is provided in the gas passageway, and
    a synchronization unit that synchronizes an opening and closing control of the three-way valves of the gas passageways,
    wherein each gas passageway is provided with the flow rate adjusting unit and the setting unit,
    when the three-way valve of the first gas passageway is opened and the three-way valve of another gas passageway is closed, the setting unit of the first gas passageway adjusts the flow rate adjusting unit of the first gas passageway using a first opening degree setting value corresponding to one process procedure acquired from the opening degree setting information storage unit so as to become a first gas flow rate in accordance with the one process procedure,
    the setting unit of the second gas passageway adjusts the flow rate adjusting unit of the second gas passageway using a second opening degree setting value corresponding to the next process procedure acquired from the opening degree setting information storage unit so that the gas flowing through the second gas passageway has a second gas flow rate, and
    when the process procedure is switched, the synchronization unit allows only the three-way vale of the second gas passageway to be opened and allows the three-way valve of another gas passageway including the first gas passageway to be closed.

2. The mass flow controller according to claim 1, further comprising:
    valves that are respectively provided near the gas inlet port and the gas outlet port.

3. The mass flow controller according to claim 2,
    wherein each gas valve is an air operation valve or an electromagnetic valve.

4. A substrate processing device comprising:
    a substrate processing chamber that includes a processing subject holding unit holding a processing subject; and
    a control unit that controls a mass flow controller, adjusting the amount of a gas supplied into the substrate processing chamber on the basis of an opening degree of a valve, in accordance with a program,
    wherein the control unit controls the mass flow controller on the basis of an opening degree setting value of the valve when the gas flows into the substrate processing chamber with a flow rate defined by the process procedure obtained in advance before performing the process procedure,
    wherein a gas passageway forming member of the mass flow controller includes:
    a gas inlet port, a gas outlet port,
    a plurality of independent gas passageways that connects the gas inlet port and the gas outlet port to each other,
    a gas exhaust port that is provided in each gas passageway,
    a three-way valve that is provided at the position where each gas exhaust port is provided in the gas passageway, and
    a synchronization unit that synchronizes an opening and closing control of the three-way valves of the gas passageways,
    wherein each gas passageway is provided with the flow rate adjusting unit and the setting unit,
    wherein the control unit informs the setting unit of the first passageway of one process procedure of the program, and then informs the setting unit of the second gas passageway of the next process procedure during the one process procedure,
    when the three-way valve of the first gas passageway is opened and the three-way valve of another gas passageway is closed, the setting unit of the first gas passageway adjusts the flow rate adjusting unit of the first gas passageway using a first opening degree setting value corresponding to one process procedure acquired from the opening degree setting information storage unit so as to become a first gas flow rate in accordance with the one process procedure,
    the setting unit of the second gas passageway adjusts the flow rate adjusting unit of the second gas passageway using a second opening degree setting value corresponding to the next process procedure acquired from the opening degree setting information storage unit so that the gas flowing through the second gas passageway has a second gas flow rate, and
    when the program is switched from the one process procedure to the next process procedure, the synchronization unit of the mass flow controller allows only the three-way vale of the second gas passageway to be opened and allows the three-way valve of another gas passageway including the first gas passageway to be closed.

5. The substrate processing device according to claim 4, wherein the mass flow controller includes valves that are respectively provided near the gas inlet port and the gas outlet port.

6. The substrate processing device according to claim 5, wherein each gas valve is an air operation valve or an electromagnetic valve.

7. A gas flow rate adjusting method of adjusting a flow rate of a gas flowing through a gas passageway using a flow rate adjusting unit including a valve that is disposed on a gas passageway and an actuator that controls an opening degree of the valve, the gas flow rate adjusting method comprising:

acquiring an opening degree setting value corresponding to a first process procedure from an opening degree setting information storage unit when an execution instruction of the first process procedure described in a program storing a gas flow rate for each process procedure is received, the opening degree setting information storage unit storing opening degree setting information including opening degree setting values of the valve, the opening degree setting value being obtained in advance for each process procedure and being used when causing a gas to flow to the gas passageway at a flow rate defined according to a process procedure before the process procedure is performed;

performing a first adjustment of flow rate by controlling the actuator on the basis of the opening degree setting value;

acquiring, in parallel with the controlling the actuator, an opening degree setting value corresponding to a second process procedure subsequent to the first process procedure in the program;

controlling an actuator in another gas passageway different from the gas passageway associated with the execution instruction of the first process procedure, on the basis of the opening degree setting value corresponding to the second process procedure; and performing switching between gas passageways by stopping the flow of the gas flowing through the gas passageway and causing the gas to flow through the another gas passageway, simultaneously when the first process procedure is switched to the second process procedure.

* * * * *